(12) United States Patent
Rantanen et al.

(10) Patent No.: US 10,921,961 B2
(45) Date of Patent: Feb. 16, 2021

(54) OUTPUTTING HISTORY LOG INFORMATION

(71) Applicant: Trimble Solutions Corporation, Espoo (FI)

(72) Inventors: Teemu Rantanen, Espoo (FI); Teemu Heikkonen, Vantaa (FI); Justiina Heilimo, Espoo (FI); Jenny Ginman, Espoo (FI); Mika Uimonen, Hyvinkää (FI); Jukka Lavonen, Helsinki (FI); Sampo Syrjänen, Espoo (FI)

(73) Assignee: Trimble Solutions Corporation, Espoo (FI)

( * ) Notice: Subject to any disclaimer, the term of this patent is extended or adjusted under 35 U.S.C. 154(b) by 172 days.

(21) Appl. No.: 16/011,232

(22) Filed: Jun. 18, 2018

(65) Prior Publication Data

US 2018/0364880 A1    Dec. 20, 2018

(30) Foreign Application Priority Data

Jun. 19, 2017  (FI) .................................... 20175570

(51) Int. Cl.
*G06F 17/20* (2006.01)
*G06F 3/0484* (2013.01)
*G06F 16/21* (2019.01)
*G06F 9/451* (2018.01)
*G06F 40/197* (2020.01)

(52) U.S. Cl.
CPC ............ *G06F 3/0484* (2013.01); *G06F 9/451* (2018.02); *G06F 16/219* (2019.01); *G06F 40/197* (2020.01)

(58) Field of Classification Search
CPC .. G06F 40/197; G06F 11/3438; G06F 16/219; G06F 9/451; G06F 3/0484
See application file for complete search history.

(56) References Cited

U.S. PATENT DOCUMENTS

| 8,271,891 | B1 * | 9/2012 | Osbourn | G06F 3/0481 715/764 |
| 8,856,661 | B2 * | 10/2014 | Kim | G06T 11/60 715/724 |
| 9,037,994 | B2 * | 5/2015 | Advani | G06F 40/194 715/781 |
| 9,063,742 | B1 * | 6/2015 | Bienkowski | G06F 8/71 |

(Continued)

OTHER PUBLICATIONS

Search Report from the Finnish Patent and Registration Office for Application No. 20175570, dated Oct. 10, 2017, 1 page.

*Primary Examiner* — Mohammed H Zuberi
(74) *Attorney, Agent, or Firm* — Kilpatrick Townsend & Stockton LLP

(57) ABSTRACT

In a lossless undo mechanism history log information on completed actions and reversed actions created by one or more completed undo functions is maintained. The lossless undo mechanism causes an undo loop between a first state created by an action to which the undo function is performed and a second state created by the last reversed action of the completed undo function. The first and second state form a pair of ends of the undo loop. The pairs of ends are used to determine intersecting undo loops. Further, a predetermined rule set is used to determine which one of two or more intersecting undo loops is selected to be outputted as an undo loop in a tree-view structure that is outputted to illustrate the history log information.

20 Claims, 8 Drawing Sheets

(56) References Cited

U.S. PATENT DOCUMENTS

| | | | |
|---|---|---|---|
| 9,075,750 B2* | 7/2015 | Gower | G06F 11/1474 |
| 9,262,185 B2* | 2/2016 | Hill | G06F 9/45512 |
| 10,296,680 B2* | 5/2019 | Morgan | G06F 30/20 |
| 2008/0040588 A1 | 2/2008 | Ukigawa et al. | |
| 2008/0109831 A1* | 5/2008 | Lee | G06F 9/451 |
| | | | 719/329 |
| 2009/0313308 A1 | 12/2009 | Green et al. | |
| 2013/0151940 A1* | 6/2013 | Bailor | G06F 40/166 |
| | | | 715/229 |
| 2014/0013209 A1* | 1/2014 | Good | G06F 40/154 |
| | | | 715/235 |
| 2016/0041963 A1* | 2/2016 | Coblenz | G06F 40/177 |
| | | | 715/227 |
| 2016/0357720 A1* | 12/2016 | Thimbleby | G09G 5/026 |
| 2017/0052927 A1* | 2/2017 | Duns | G06F 40/106 |
| 2017/0235710 A1* | 8/2017 | Simons | G06F 40/166 |
| | | | 715/229 |
| 2018/0364880 A1* | 12/2018 | Rantanen | G06F 9/451 |
| 2020/0293685 A1* | 9/2020 | Levay | G06F 40/197 |

\* cited by examiner

OUTPUTTING HISTORY LOG INFORMATION

REFERENCE TO RELATED APPLICATIONS

This application claims priority to Finnish patent application no. 20175570, filed on Jun. 19, 2017, the contents of which is hereby incorporated herein by reference in its entirety.

TECHNICAL FIELD

The present invention relates generally to outputting history log information, and especially outputting history log information in a tree-view structure.

BACKGROUND ART

Almost all applications, while running on a computer, provide an undo function with which a user may undo one or more of his/her previous actions. In a simple undo mechanism, once the user performs an action that creates a new state after one or more undo functions, the previous actions and corresponding states that were undone are deleted from history log information. The undone actions cannot anymore be returned to but need to be performed again, if they were erroneously undone. For example, if history log information is A-B-C-D, after which an "undo to A" is made and E added, the history log information in the simple undo is A-E. In a lossless undo mechanism, actions that are undone are preserved by unfolding them so that the history log information remains linear. Using the above example, the history log information in the lossless undo mechanism is A-B-C-D-D'-C'-B'-E. This enables that if, after an action that creates a new state, or later during processing, the user notices one or more erroneously undone actions, it is possible to revert back to the corresponding state, by doing a further undo function. However, although the history log information remains linear in the lossless undo mechanism, as can be seen from the example, after one or more undo functions the history log information appears as a complex log. Such a log may be difficult to understand, and therefore the user is not able to utilize the lossless undo mechanism as efficiently as it could be used.

SUMMARY OF THE INVENTION

The invention relates to a method, a program product, and an apparatus which are characterized by what is stated in the independent claims. The preferred embodiments are disclosed in the dependent claims.

A general aspect introduces how to generate from history log information a tree-view structure to be outputted when the lossless undo mechanism is the implemented undo mechanism. The tree-view structure provides a simple view overcoming a problem specifically arising in computer implemented applications using the lossless undo mechanism.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any application configured or configurable to track history information (history log information) on actions, also called as operations, or transactions or changes or edits or modifications, and to support a lossless undo mechanism. A non-limiting list of examples include word processing applications, spreadsheet applications, graphic design applications, media development applications, and product engineering applications including building information modeling applications, architectural modeling applications and structural engineering applications.

Figure 1:
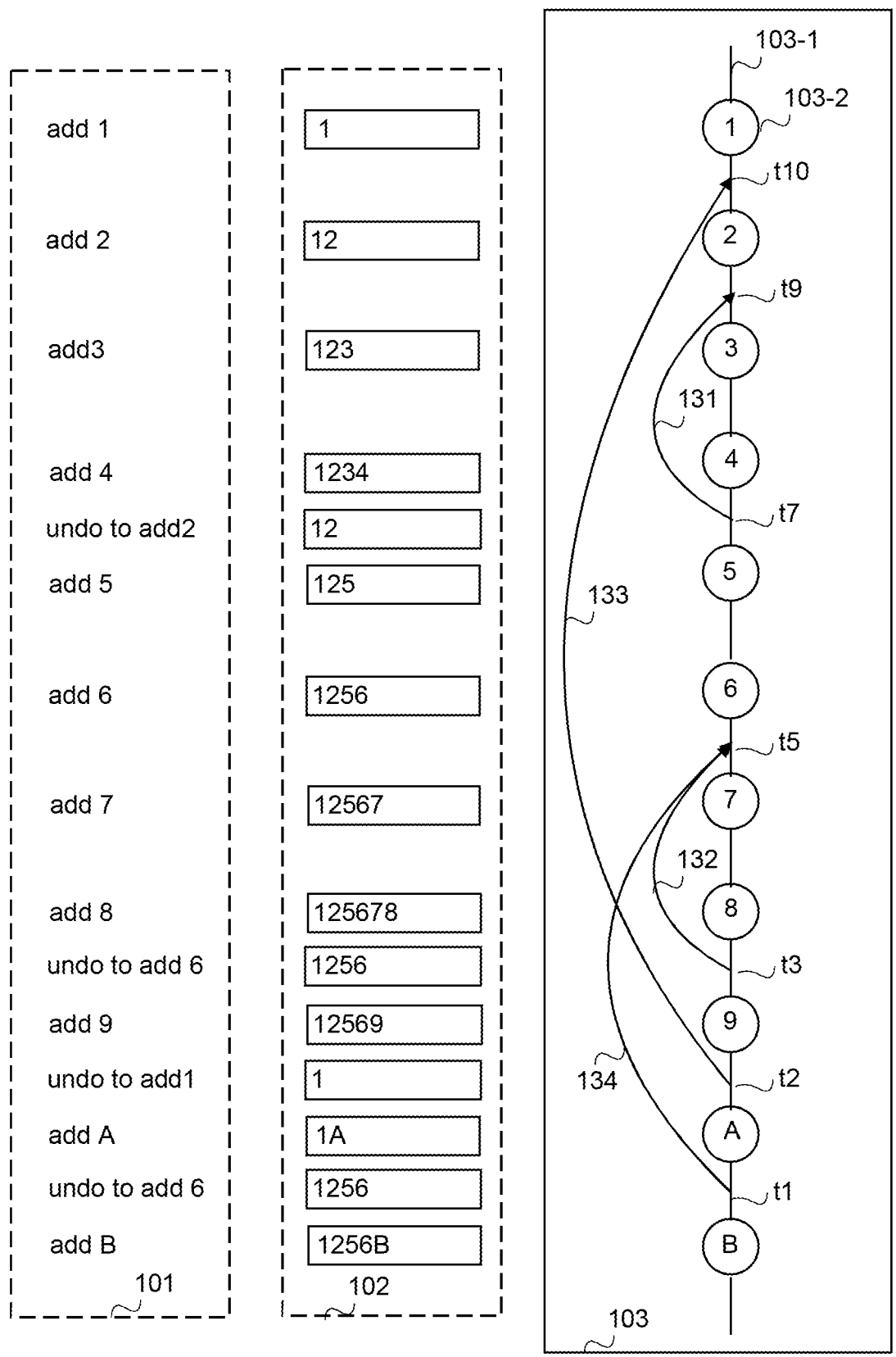
FIG. 1 is a schematic diagram illustrating mapping of different user changes to states and history positions.

FIG. 1 is a schematic diagram illustrating mapping of different user changes (actions) to states and history positions. The history information 101 in FIG. 1 illustrates user's actions in time, in the illustrated Figure starting from the oldest to the newest, mapped to corresponding state information 102 depicted in boxes, and to a corresponding data structure 103 that in the illustrated example is history position information. Assuming that the user is typing a text, the state information illustrated in a corresponding box is at the same time a text shown to a user. However, it should be appreciated that the "adds" as actions in FIG. 1 may illustrate any action, like adding beams, columns, etc., or deleting something previously added, or modifying something previously added. In other words, the adding is a mere example of an action, and the actual actions bear no significance to the invention. Therefore they need not to be described in more detail herein.

The history position information 103 depicts the different states and transitions (completed actions) between the states. The history position information 103 is one way to track completed actions, including undo functions, and maintain the history log information in the memory. Below term "action" is used in the meaning of a completed action, and term "undo" in the meaning of an undo function, or an undo command.

The used data structure in the example of FIG. 1 comprises two kinds of history positions: so called middle positions 103-1 for states, depicted by lines, and action positions 103-2 for actions, other than undos, depicted by circles. An action position 103-2 depicts an actual action that creates a state when the action is completed, and each action position has at both sides a middle position 103-1: one depicting an initial state or a start state before the action and the other one a new state or an end state after the action has been completed. The end state is a state corresponding to the action since it is created in response to the action being completed. The middle positions are used for tracking undos, and redos (redo meaning undoing an undo). An undo causes that from a corresponding middle position, i.e. the middle position after the last action that is to be undone, which is typically in a linear lossless undo mechanism the last action, an arc 131, 132, 133, 134 is made to a middle position above the action that is the oldest to be undone, or in other words, below the action that is the oldest not to be undone. The end positions of the undo, i.e. a state corresponding to the first action to which the undo is made, illustrated by t1, t2, t3, t7 in FIG. 1, to the other end of the undo, i.e. to a first state corresponding to a first action that is not undone, illustrated by t5, t9 and t10 in FIG. 1, defines an undo loop.

Although not illustrated in FIG. 1, in the lossless undo mechanism an undo loop is always a symmetrical loop because it is created in an unfolding, as described above. That means that after N actions that are undone their reversed actions are added in reverse order. For example, using the example illustrated in FIG. 1, starting from the beginning to the "undo to add 2", i.e. action "1-2-3-4- unfolding to 2" is 1-2-3-4-4'-3' in which 3-4-4'-3' defines the undo loop (and 4' negates to 4, 3' negates 3). Naturally the reversed actions may be grouped together to one negation, i.e. the above example could be 1-2-3-4-43', having a combined reversed actions, for example. Another example includes a simplification, for example "create object A; edit-object-A; edit-object-A; revert-object-A-to-original-state-before-first-edit" could be simplified to "revert object A to an original state". In other words, any suitable notation can be used as long as the actions are conceptually reversed. An undo loop is a sequence of one or more reversed actions and one or more actions that were reversed. The undo loop contains two ends, one of which is a state whereto the undo is made, the other end being a state after the last reversed action. An undo loop contains within the two ends one or more state transitions from the initial state to a new state, and one or more reversed state transitions from the new state back to an earlier initial state. States at the both ends of the undo loop are identical, but state transitions do not have to be fully symmetrical compared to reversed state transitions, as explained above. In other words, a completed undo function forms an undo loop between a first state to which the undo function is performed and a second state after the last reversed action of the completed undo function. Using the example of FIG. 1, the history log, when "add A" completes "undo to add 1" is: 1 2 3 4 4' 3' 5 6 7 8 8' 7' 9 9' 7 8 8' 7' 6' 5' 3 4 4' 3' 2' A. Further, an undo loop between the state after 1, i.e. state created by completed action "add 1" and whereto the undo is done, and the state after 2', i.e. the state created by the last reversed action, is caused (created). It should be appreciated that any notation in the history log information may be used. For example, after "add A" the history information loop could be expressed, for example, as: 1 (2 (3 4 | 4' 3') 5 6 (7 8 | 8' 7') 9 | 9' (7 8 | 8' 7') 6' 5' (3 4 | 4' 3') 2') A. In the example brackets denote undo loop ends and vertical lines indicate symmetry points of undo loops (states wherefrom undos are performed).

As can be seen from the example of FIG. 1, the undo loops, as depicted by corresponding arcs in the data structure 103, may overlap. An overlap may be a nested overlap in which an undo loop is nested inside another undo loop, such as the undo loops 131 and 132 are nested inside the undo loop 133. Another overlap type is an intersecting overlap, in which an undo loop is intersecting one or more other undo loops. In the example illustrated in FIG. 1, the undo loop 134 intersects the undo loops 132 and 133. Further, as can be seen from the example illustrated FIG. 1 in the data structure, an undo loop may end to/start from the same middle point as one or more other undo loops, like undo loops 134 and 132 ending to t5, but since an undo is typically tracked as an undo after another action (transaction/operation) that creates a state has taken place and not while flip flopping (reverting back and forth between already existing states by undo-undo undo (i.e. redo) functions), the undo loops cannot have the same pair of ends, i.e. the same initial state and the same new state. At least one of them needs to be different.

As is evident from FIG. 1, outputting the history log information, tracked by the computer in a form of a data structure that differentiates actions that creates states and "lossless undos", in a tree structure, especially when a lossless undo mechanism is implemented in such a way that undo loops may intersect, is not a straightforward task for one skilled in the art. Further, since the lossless undo mechanism is possible only in the realm of computer implemented applications, a further hurdle to mentally track what has been undone and what not, exists in the realm of computers.

Below solutions how to output history log information in a tree structure also when history position information comprises intersecting and overlapping undo loops will be described in more detail.

Figure 2:
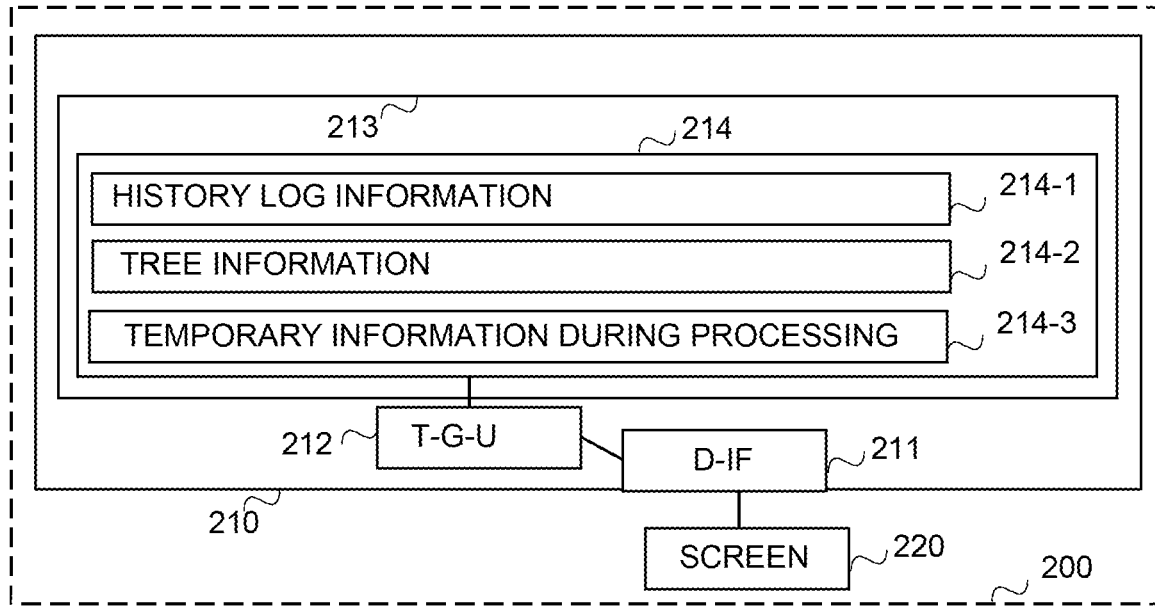
FIG. 2 shows a simplified architecture of an exemplary system and a schematic block diagram of an exemplary apparatus.

FIG. 2 illustrates a simplified system describing only some logical units with their operative connections, the implementation of which may deviate from what is presented. It is obvious to a person skilled in the art that the system may also comprise other functions and structures that need not be described in greater detail here. The more detailed structure of the system is irrelevant to the actual invention.

The system 200 illustrated in FIG. 2 is a simplified computing environment that comprises one or more apparatuses 210 (only one shown in FIG. 2) connected to one or more display devices 220 (only one shown in FIG. 2).

The apparatus 210 may be any computing device that can be configured to run at least one application that is configurable to generate a tree-view structure for a lossless undo mechanism on a display device 220. For that purpose the apparatus 210 comprises one or more display interfaces (D-IF) 211, a tree generation unit (T-G-U) 212, and in a memory 213 run-time information 214 for the tree generation unit. In the illustrated example, the run-time information 214 comprises three types of information: history log information 214-1, tree information 214-2 and other temporary information maintained during processing 214-3.

The history log information 214-1 may comprise for example the data structure illustrated in FIG. 1. The tree information 214-2 is created during the tree generation and examples of its content will be described below, as well as examples of the other temporary information.

It should be appreciated that the above described organization of the run-time information is just an example to organize the information used for determining what is outputted (displayed) in the tree-view structure, and any other way to organize them may be used. Further, depending on an implementation other information may be needed or some pieces of the disclosed information may be left out.

The display device 220, or display devices, may be any kind of a screen or other display unit providing a graphical user interface, either external to the apparatus or integrated to the apparatus. Examples of such display devices include different screens, like a touchscreen, a display screen, a projection screen, a TV screen, a wearable screen, like an optical head-mounted display and an augmented reality helmet, a holographic display, and monitors, like a computer monitor and a portable display monitor.

The computer environment illustrated in FIG. 2 represents one example which may be implemented by one apparatus comprising also the screen/display device integrated. Examples of such apparatuses include a user terminal or a work station, such as a laptop, a smartphone, a personal computer, a tablet computer, a field device, an e-reading device, or a personal digital assistant (PDA), or a web client, or a server, like a cloud server or a grid server. In larger systems, the apparatus may be a terminal and the memory a data storage with which the terminal communicates via a server. In such a system, the server may be configured to perform one or more of the tree generation unit functionalities. The data storage may be any kind of conventional or future data repository, including distributed and centralized storing of data, managed by any suitable management system forming part of the computing environment. An example of distributed storing includes a cloud-based storage in a cloud environment (which may be a public cloud, a community cloud, a private cloud, or a hybrid cloud, for example). The implementation of the data storage/memory, the manner how data is stored, retrieved and updated, and the location where functionalities relating to action tracking for the history log information and the actual outputting/displaying are performed are irrelevant to the invention.

Figure 3:
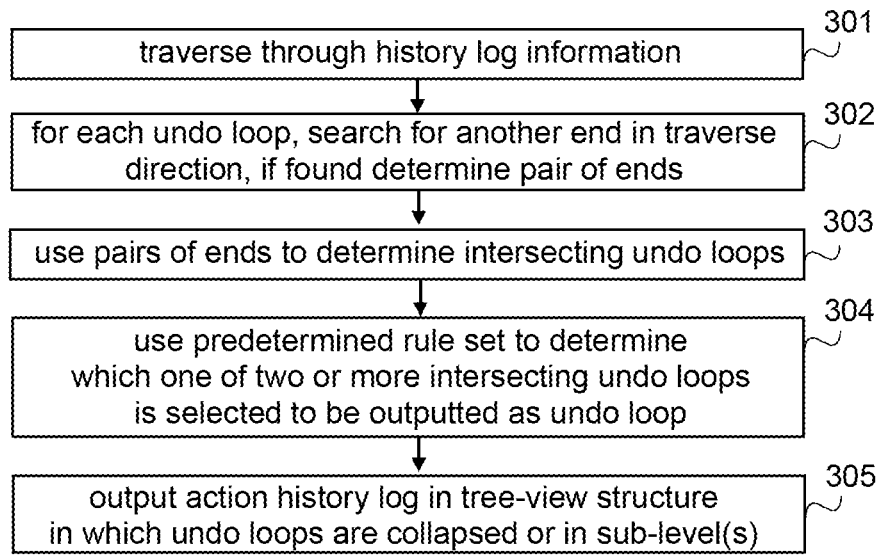
FIGS. 3 to 7 illustrate different exemplary functionalities.

FIG. 3 illustrates an exemplified functionality of the tree generation unit that may be performed as a background operation of a running application or in response to a user input indicating "output history log information". FIGS. 8A to 8F illustrate different outputs.

Referring to FIG. 3, the history log information, i.e. the action history log, is traversed through in step 301. If a starting point is the first state, the traverse direction is from the oldest to the newest. If the starting point is the latest state, the traverse direction is from the newest to the oldest. If the starting point is somewhere between the latest and the first, the history log information is preferably traversed from the starting point to the first (oldest) point and from the starting point to the latest (newest) point. Naturally one may implement a solution in which the history log information is traversed either from the starting point to or towards the first point or from the starting point to the latest point.

While the history log information is traversed through, for each detected undo in the traverse direction, loop ends pair, called also a pair of ends of a loop, are searched for and if a counter-end for the pair is found, the pair of ends is determined in step 302. That also means that the tree generation process performed by the tree generation unit detects existence of an undo loop pair in the traverse direction. Using the example of FIG. 1, and assuming that the traverse direction is from the newest to the oldest, undo loops 134, 133, 132 and 131 are detected, and corresponding pairs of loop ends t1-t5, t2-t10, t3-t5, t7-t9 are determined. The pairs of loop ends are used in step 303 to determine intersecting undo loops. Using the example of FIG. 1, intersecting undo loops are loops 134 and 133 since both pairs has one end that is within a range defined by the other loop's pair of ends. If both ends of a pair are within the range, the loop is not an intersecting undo loop but a nested undo loop.

Then, if there are intersecting undo loops, a predetermined rule set, i.e. one or more predetermined rules, are used in step 304 to determine which one of the two or more intersecting undo loops is selected to be the undo loop that is outputted as the undo loop, while the actions in the one or more other non-selected intersecting undo loops that are not also in the selected undo loop are output as actions. The predetermined rule may be that the undo loop that has an end point that is nearest to the starting point is selected, or the longest loop is selected. Another example is that actions may be given different weights, for example adding a beam may have a bigger weight than deleting a slab, and the sum of the weights of the actions within an undo loop (i.e. the actions that were undone) are calculated and the undo loop having the biggest weight is selected (or the one having the smallest weight). Still another example includes use of heuristic function to determine which one of the undo loops corresponds best to the behavior of the user, i.e. foresees which one of the undo loops is caused by a rather common error of the user. As is evident from the above, any rule set may be used for determining which one of the intersecting undo loops to select.

Once the undo loops that are to be included into the tree structure have been determined, the determining including selecting an undo loop amongst intersecting undo loops, if needed, the history log information (action history or state history) may be outputted in step 305 in a tree-view structure. The tree-view structure displays the actions, or corresponding states, in a hierarchical list of actions (states) in which an undo loop is displayed either as a closed loop or in a sub-level. For example, starting from the starting point and traversing to the traverse direction, a state, or corresponding action, is outputted until an undo loop is detected, and then a "jump" is made so that the actions that were undone are not outputted. In another example, when an undo loop is detected, a sub-level is created and the actions in the undo loop are outputted in the sub-level until the other end of the undo loop is reached in which case a return to the higher level is made.

Figure 4:
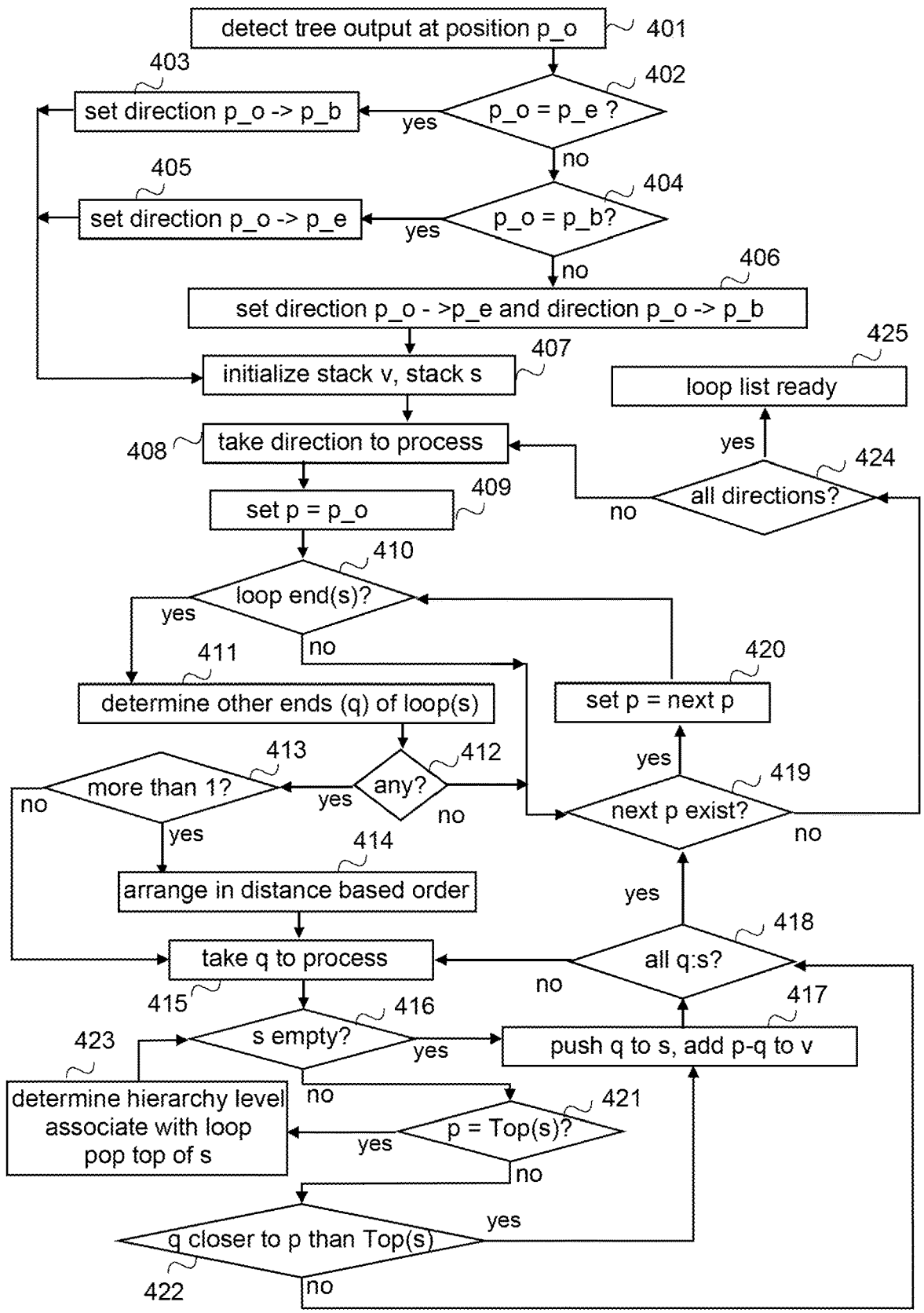

FIG. 4 illustrates another exemplified functionality of the tree generation unit. In the illustrated example it is assumed that the user may indicate the starting point p_o for the process. Applying the process to a solution in which the system determines the starting point is a straightforward process to one skilled in the art. The system may be configured to use as the starting point the newest state, the oldest state, the current state, a middle state, etc. In other words, there is no restrictions what the system should be configured to use as the starting point. Further, in the example illustrated it is assumed that the whole history log information may be outputted. However, one may easily restrict that only N latest actions (illustrated by circles in 103 in FIG. 1), or corresponding states, may be outputted, in which case, when implementing the process described in FIG. 4, the first position maintained in the history position information is to be interpreted to be the Nth latest position.

Referring to FIG. 4 when a user input indicating that the history log information should be outputted in a tree-view structure created at the starting position p_o, is detected in step 401, one or more traverse directions are determined. More precisely, it is checked, whether the starting position p_o is the current last position p_e (step 402), or the first position p_b (step 404) maintained in the history position information. If the starting position p_o is the current last position p_e (step 402: yes), a traverse direction from p_o to p_b is set in step 403. If the starting position p_o is the first position p_b (step 404: yes), a traverse direction from p_o to p_e is set in step 405. If the starting position is neither one of the end positions (step 402: no; step 404: no) it is a position somewhere in the middle of the history position information and two traverse directions are set in step 406, one from p_o to p_e and one from p_o to p_b.

Once one or more traverse directions are set (step 403, step 405 or step 406), a stack v for undo loop list and a stacks that is an aid stack are initialized in step 407 and a direction is taken in step 408 to be processed (i.e. to be traversed through).

The above steps 401 to 407 form a kind of preparatory phase and the actual determining and selection phase comprises steps 408 to 425.

First a variable p is set in step 409 to be p_o. Then it is checked in step 410, whether at position p in the history position information there is an undo, or more precisely one or more ends of one or more undo loops. If there is, the other end position(s) q of the undo loop(s) is (are) in the direction that is currently processed is(are) determined in step 411. Then it is checked in step 412 if any q were determined, and if yes (step 412: yes), it is checked in step 413, whether more than one q was determined in step 411. If yes (step 413: yes), the other ends (q:s) are arranged in step 414 to a distance based order. In the illustrated example in the distance based order the farthermost, according to the direction currently processed, end is the first one and the nearest is the last one. Once the other ends are ordered, the first q is taken in step 415 to be processed, or if one q was determined (step 413: no) the q is taken in step 415 to be processed. By processing the other end points in the order described above, the longest undo loop is processed first, i.e. a selection rule "the longest undo loop of undo loops sharing the same end point is processed first" is implemented with the help of these steps.

Then it is checked in step 416, whether or not the stack s is empty. If it is (step 416: yes), the position q is pushed in step 417 to the stack s and the positions p and q, i.e. the pair of ends of the undo loop are added in step 417 to the undo loop list in stack v. After that it is checked in step 418 whether or not all q:s determined in step 411 have been processed. If not, the process returns to step 415 to take a first unprocessed q to be processed. If all q:s are processed (step 418: yes), the process checks in step 419, whether or not next p exists in the direction. In other words, it is checked whether current position p is the last possible in the direction.

The process proceeds directly to step 419 to check whether or not the next p exists if there is no loop ends in p (step 410: no).

If the next p exists (step 419: yes), the position p is set in step 420 to be the position of the next p, and then the process proceeds to step 410 to check whether there are any loop ends at the position corresponding to the position p.

If the stack s is not empty (step 416: no), it is checked in step 421, whether or not the position p is the same as the position at the top of the stack s. In other words, it is checked whether the other end of the loop currently processed have been reached.

If the position p is not the same as the position at the top of the stack s (step 421: no), it is check in step 422 whether the position q is closer to the position p than to the position at the top of the stack s. If it is (step 422: yes), a smaller undo loop (a nested undo loop) inside a longer undo loop is detected, and the process proceeds to step 417 to push the position q to the stack s (to the top of it) and to add the positions p and q, i.e. the pair of ends of the current undo loop, to the undo loop list in stack v.

If the position q is not closer to the position p than to the position at the top of the stack s (step 422: no) an intersecting undo loop is detected and filtered away by simply not adding anything to the stacks but continuing the process in step 418 in which it is checked whether or not all q:s have been processed.

If the position p is the same as the position at the top of the stack s (step 421: yes), the end of the loop has been reached, and the stacks is used to determine in step 423 a hierarchy level (sub-level) of the undo loop by simply calculating how many values there are in the stacks, and in the illustrated example the indication of the hierarchy level is associated in step 423 with the corresponding undo loop (by means of position q) in the loop list in the stack v, and then the position q is removed (popped) in step 423 from the top of the stack s. Then the process continues to step 416 to check whether or not the stack s is empty.

If no next p exists (step 419: no), it is checked in step 424 whether all determined directions have been processed (traversed through). If not, the process continues to step 408 to take an unprocessed direction to be processed.

If all directions been processed (step 424: yes), the loop list is ready to be outputted (step 425), i.e. the stack v contains the undo loops with hierarchy level information. For example, if the position p_o is the uppermost middle position in FIG. 1, undo loops depicted by arcs 131, 132 and 133 would be in the stack, the one depicted by 131 with hierarchy level information 1, the other two with hierarchy level information 2. Another example is that position p_o is the middle position between t5 and t7 in FIG. 1. In such a situation the undo loop depicted by arc 133 would not be in the undo loop list in stack v since the undo loop ends are in different directions, so the check in step 412 would result to "no".

Although illustrated as a separate process in FIGS. 3 and 4, the information needed to output tree-view structure on history log information, i.e. the process described in steps 301 to 304, or the process illustrated in FIG. 4 resulting to a loop list as the tree information may be performed continuously as a background process when a user is using the application, so that when the user wants to see the tree-view structure, information needed for outputting the tree-view structure already exists. However, especially the process described in FIG. 4 is so efficient that there is no need to perform it as a background process but it may be performed on a fly when needed.

Figure 5:
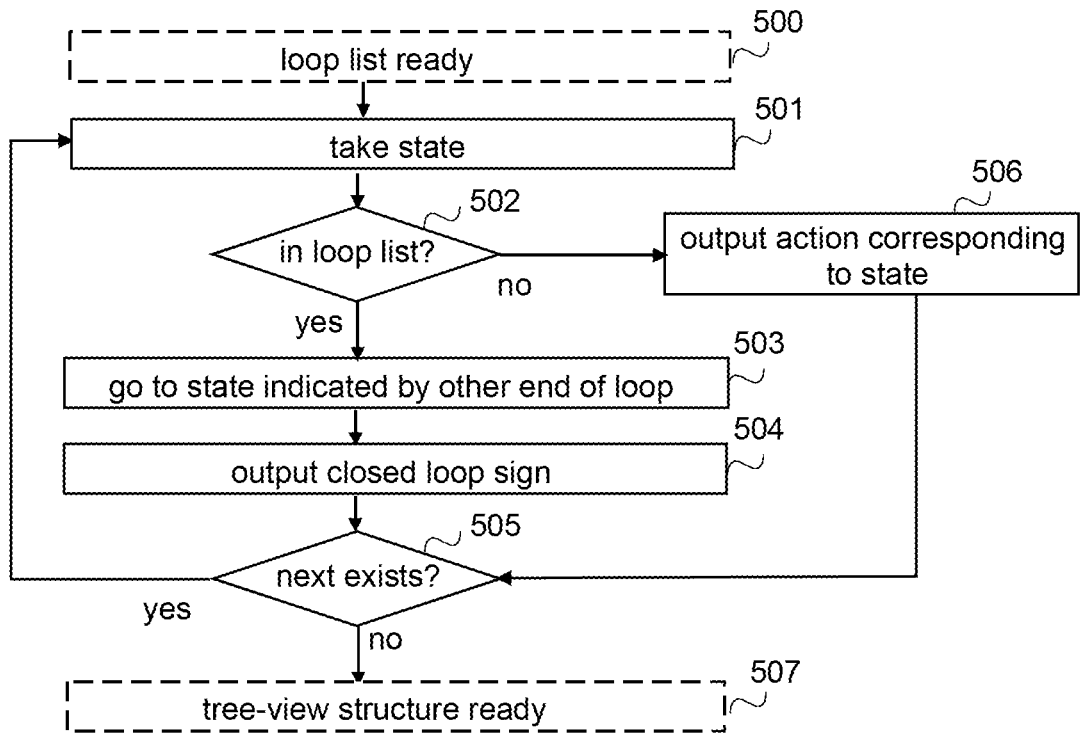

FIG. 5 illustrates functionality of the tree generation unit when an application is running, the undo loop list is ready and no tree-view structure is outputted on a screen. In the example it is assumed that actions are output so that the newest action is the upmost action. Implementing the solution to a reverse output order, i.e. the newest being the bottom outputted action, is a straightforward process to one skilled in the art. Further, in FIG. 5 it is assumed that a default outputted tree-view structure hides undo loops with corresponding actions in collapsed parts.

When the undo loop list have been created (step 500), for example with the process described in FIG. 3 or 4, the history position information will be processed from the newest to the oldest (or to the oldest to be outputted, if only N latest are outputted). Therefore a state amongst states, depicted by the middle points in the history position information 103 in FIG. 1, is taken in step 501, and then it is checked in step 502, whether or not the state is in the undo loop list. If it is (step 502: yes), the process goes in step 503 to a state indicated by the other end of the pair of ends of the undo loop, and if there are several undo loops, to the other end of the undo loop in the highest level, outputs in step 504 a sign that indicates that there is a closed undo loop, and then it is checked in step 505 whether or not a next state exists. If it exists (step 505: yes), the process continues to step 501 to take the next state to be processed.

If the state is not in the undo loop list (step 502: no), the process outputs in step 506 an action corresponding to the state. Then the process proceeds to step 505 to check whether or not a next state exists.

If no next state exists (step 505: no), the outputted tree-view structure is ready.

Figure 6:
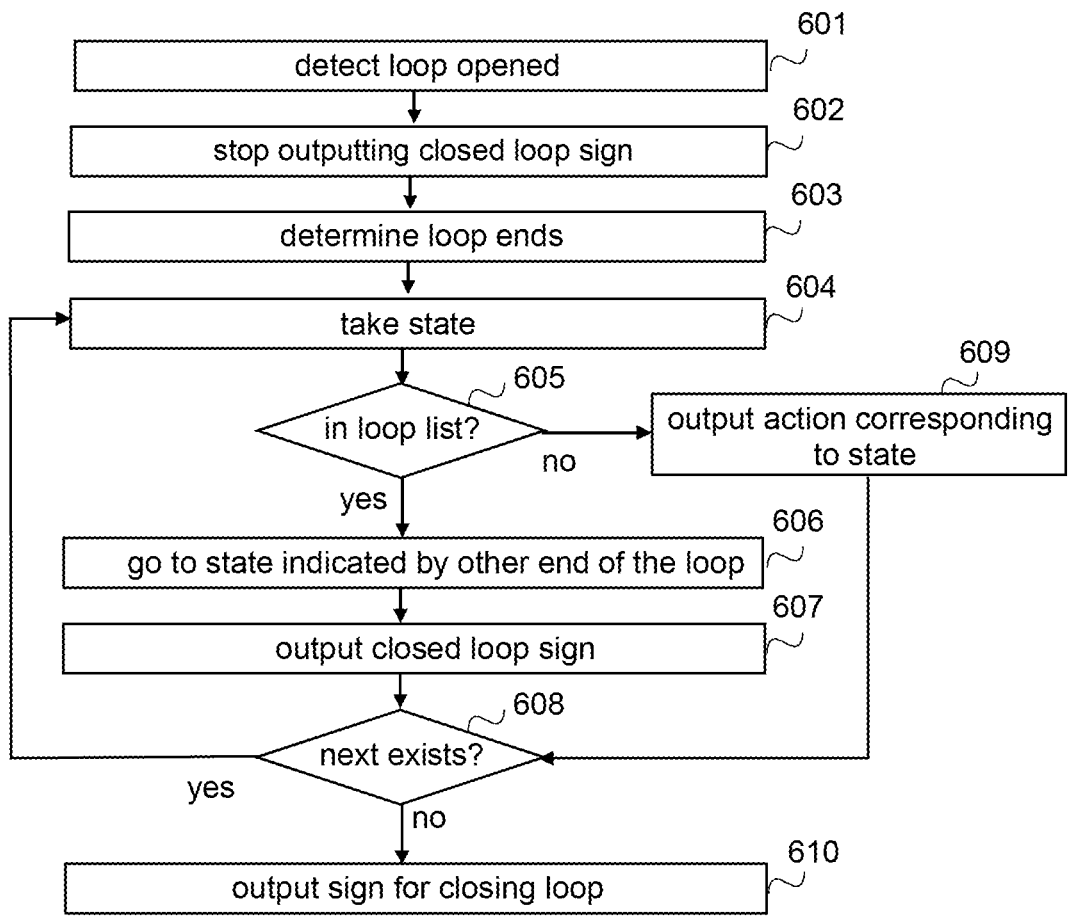
Figure 7:
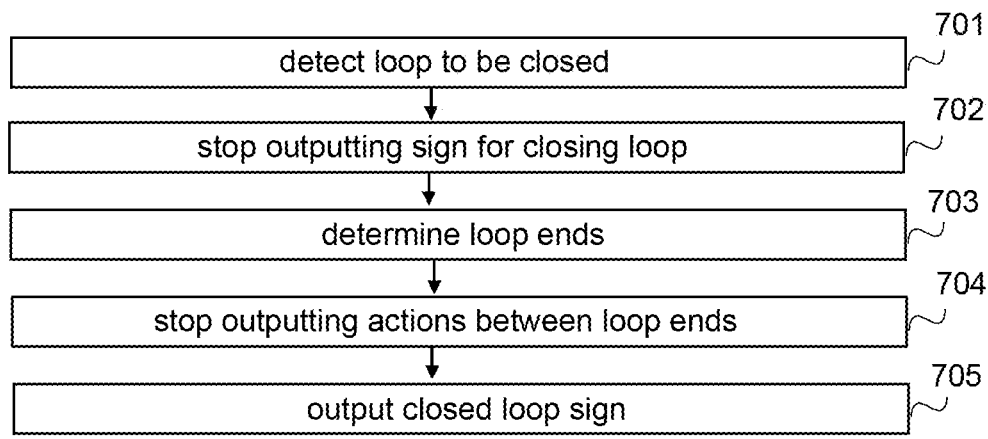

FIGS. 6 and 7 illustrate functionality of the tree generator unit, or its subunit(s) when the tree-view structure is output. The actual output may be a completed action or a state created by the completed action.

Referring to FIG. 6, when a user input indicating that a collapsed loop is to be opened is detected in step 601, outputting the corresponding closed loop sign is stopped in step 602. Further, the loop ends are determined in step 603, and a state that is one of the ends in the pair of the ends of the loop is taken to be processed in step 604. Then it is checked in step 605 whether or not the state is in the loop list associated also with one or more other loops than the one which is to be opened. (For example this may apply to t5 in FIG. 1). If it is (step 605: yes) the process goes in step 606 to a state indicated by the other end of the pair of the ends of the other undo loop, and if there are several undo loops, to the other end of the undo loop in the next highest level, compared to the level of the undo loop that is opened, outputs in step 607 a sign that indicates that there is a closed undo loop, After that it is checked in step 608 whether or not a next state exists within the loop that is to be opened. If it exists (step 608: yes), the process continues to step 604 to take the next state to be processed.

If the state is not in the loop list, or if the state is in the loop list but not associated also with one or more other loops than the one which is to be opened (step 605: no), the process outputs in step 609 an action that corresponds to the state. Then the process proceeds to step 608 to check whether a next state exists within the loop that is to be opened.

If no next state exists within the loop that is to be opened (step 608: no), the undo loop has been opened, and a sign for closing the opened loop is outputted in step 610.

Referring to FIG. 7, when a user input indicating that an opened undo loop is to be closed is detected in step 701, outputting the corresponding sign for closing the loop is stopped in step 702. Further, the pair of the ends of the undo loop is determined in step 703 using the loop list. Then outputting actions between the pair of the loop ends determined in step 703 is stopped in step 704 and a closed loop sign is outputted in step 705 indicating the location of the undo loop.

FIGS. 8A to 8F illustrate different examples of displayed history logs (history log information) in corresponding tree-view structures, based on the example illustrated in FIG. 1.

Figure 8A:
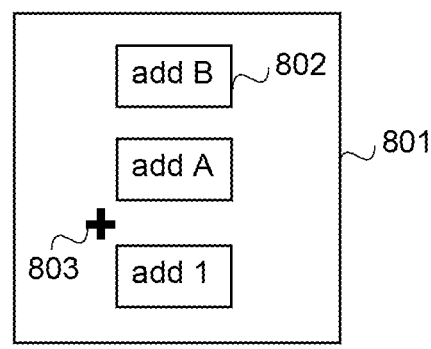
FIGS. 8A to 8F illustrate different tree-view structures.

FIG. 8A illustrates a tree-view structure 801 created using as a starting position the uppermost middle position (before action "add 1") in FIG. 1, and the process described with FIG. 4, the end result being that the latest action "add B" 802 is outputted as a first outputted action. Naturally it could be outputted as the last outputted action. The plus sign 803 illustrates that there are hidden actions, i.e. the tree-view structure is outputted having collapsed parts. If the starting position had been the middle position denoted by t2 in FIG. 1, the end result would have been the same.

Figure 8B:
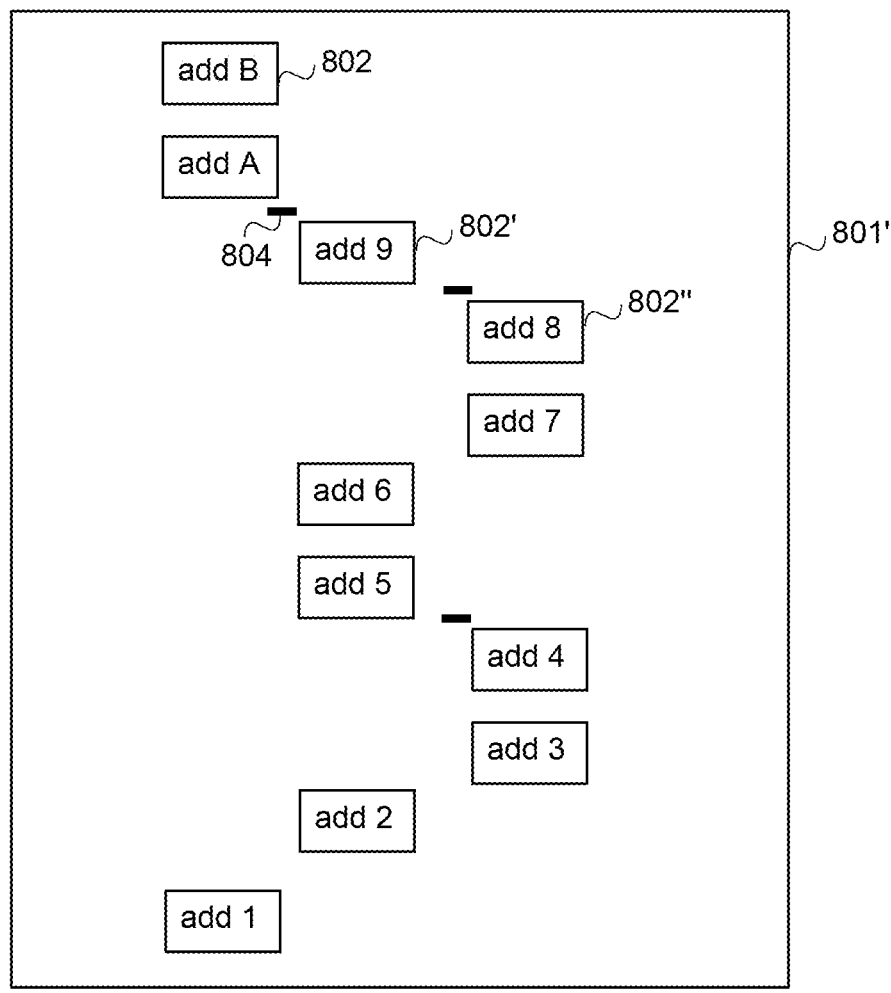

FIG. 8B illustrates the tree-view structure 801' of FIG. 8A with all hidden (folded/collapsed) actions revealed. As can be seen, undo loops depicted by arcs 131, 132 and 133 in FIG. 1 are selected to be outputted as undo loops. The minus signs 804 illustrates a possibility to close the loop above which the minus sign 804 is outputted.

Figure 8C:
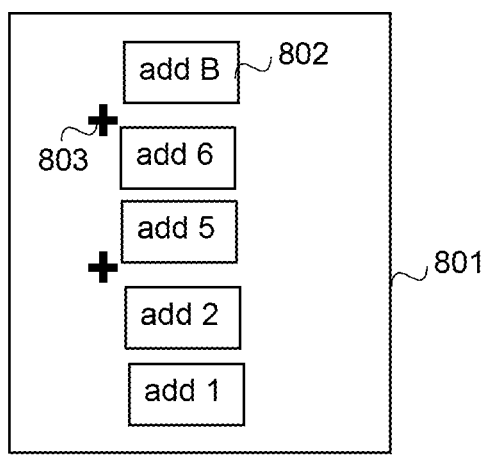

FIG. 8C illustrates a tree-view structure 801 that differs from the one illustrated in FIG. 8A in that respect that it has been created using as starting position the last position, or the middle position between actions "add 5" and "add 6" in FIG. 1. The plus signs 804 illustrates that in addition to outputted action 802 there are hidden actions.

Figure 8D:
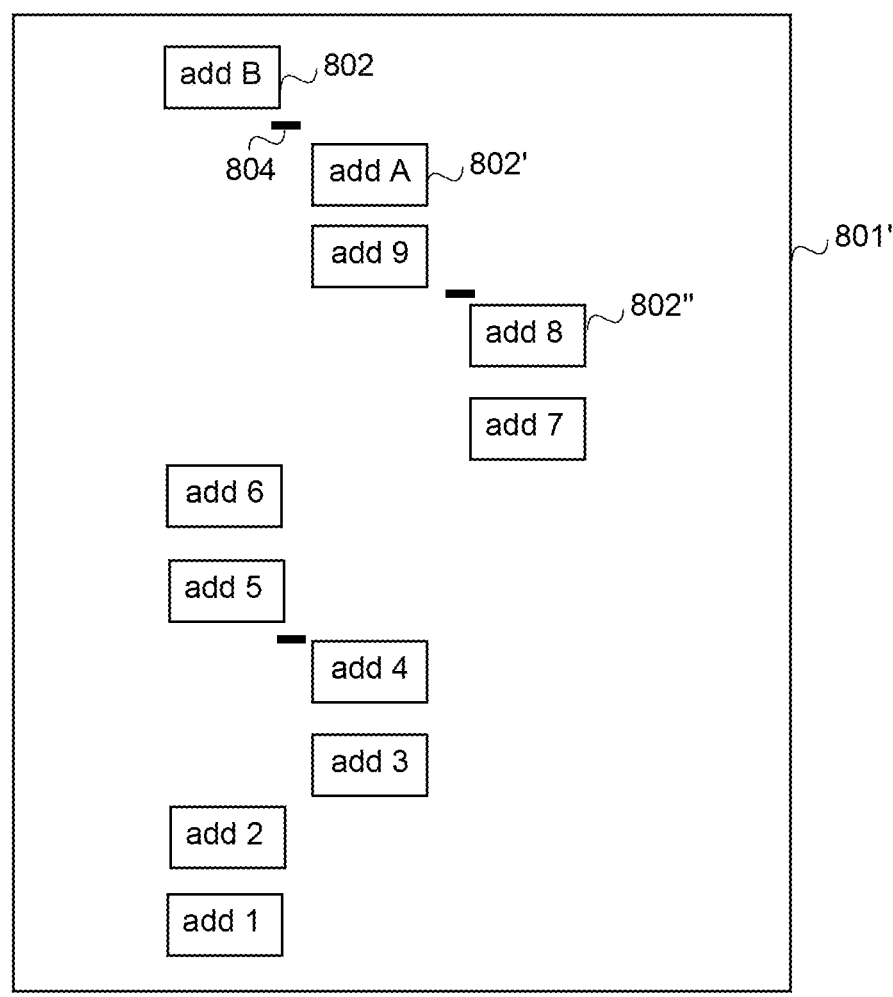

FIG. 8D illustrates the tree-view structure 801' of FIG. 8C with all hidden (folded/collapsed) actions revealed. As can be seen, undo loops depicted by arcs 131 and 132 in FIG. 1 are selected to be outputted as undo loops, and the actions 802, 802', 802" are in three different hierarchical levels.

Figure 8E:
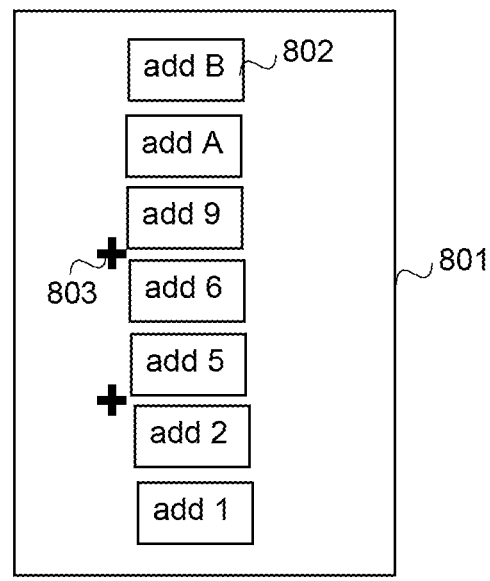

FIG. 8E illustrates a further outputted tree-view structure 801 created using as a starting position the position denoted by t3 in FIG. 1. As in the other tree-view structures, also herein the tree-view structure 801 starts with action 802 "add B", but the hidden actions (collapsed undo loops) indicated by corresponding plus signs 803 are different than in the previous ones.

Figure 8F:
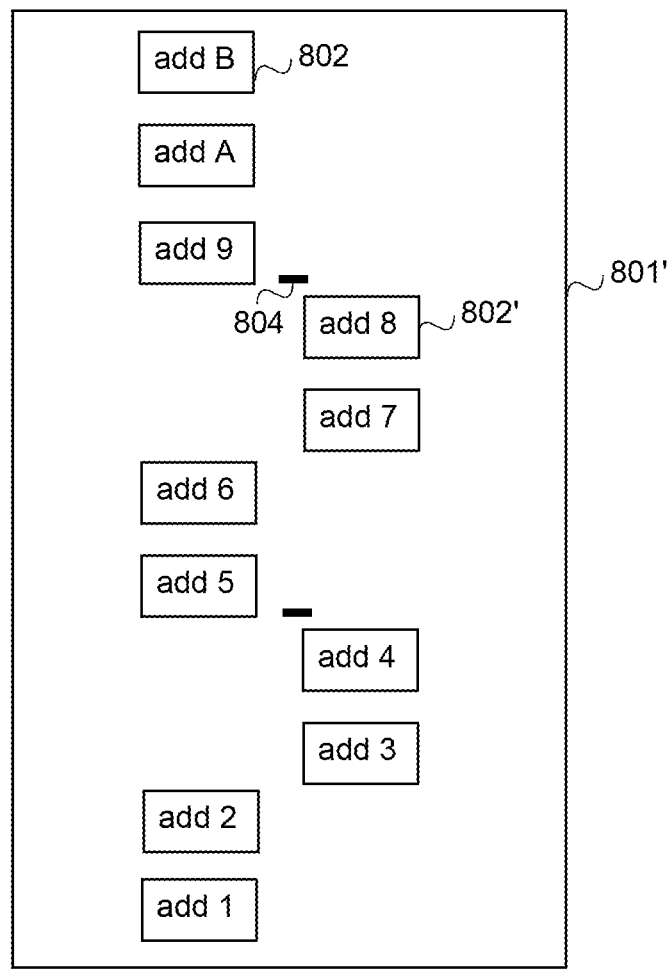

FIG. 8F illustrates the tree-view structure 801 of FIG. 8E when all collapsed undo loops are opened, and closable as depicted by the minus sign 804. As can be seen, the undo loops depicted by arcs 131 and 132 are selected to be the outputted as the undo loops, and actions 802, 802' are in two hierarchical levels.

As can be seen from the examples illustrated in FIGS. 8A to 8F, the starting point affects what is outputted, i.e. how the outputted information is obtained and which undo loops are selected, but all actions are remaining and outputted when all undo loops are opened. In other words, no data is lost.

The user may use the outputted tree-view structure to select a state whereto perform an undo from the current state by selecting from the corresponding outputted actions those that are to be undone. For example, if a user wants to do after "add B" an undo to "add 1", the user may select from the tree-view structure illustrated in FIG. 8A actions "add B" and "add A" and "undo", or select "add 1" and "undo to this". If the undo log is the one illustrated in FIG. 8B, all actions from "add B" to "add 2" has to be selected to obtain the same result.

However, if the user is undoing actions one by one, for example by clicking an icon performing one undo, the system may be configured to utilize the output tree-view structure so that if the undo log is in the form of illustrated in FIG. 8A it suffices to do undo twice. However, in another implementation the output logs are not utilized in the one by one undoing but the history log information is used.

The above described mechanisms/functions to output a history log information when a lossless undo mechanism is used, maintains all actions and corresponding states although intersecting undo loops are filtered from the output. Further, thanks to the filtering, i.e. selecting which intersecting undo loops are to be outputted as undo loops and using collapsible multi-level tree-view structure the history log information can be outputted in a form that is easier for users to interpret and use even when the lossless undo functionality (mechanism) is implemented, thereby facilitating the use of the lossless undo functionality. However, as said above, no actions are lost. A further effect is that undoing several actions, i.e. returning to an earlier state is far more easier, and a risk that too many undo functions are erroneously performed because the history log information is difficult to interpret, is minimized.

As a summary, the disclosed mechanisms combine the easy and illustrative history log information tree obtainable when the simple undo mechanism is implemented with the versatile possibilities to undo and "undo undo" (redo) provided by the lossless undo mechanism by converting overlapping undo loops of the lossless undo mechanism to a tree-view structure that maintains all states and corresponding actions so that even after a new state has been added after an undo, one can return to any previous state. Further, the disclosed mechanisms defines how the tree-view structure output is created, independent on the content outputted as actions/states, and is clearly in the realm of computers since the lossless undo mechanism exists only in computer implemented applications. Further, the disclosed way to output history log information provides the history log information to a user in a technical tool (tree-view structure) that makes the technical task of tracking actions and correcting earlier made mistakes by undoing them more efficient, precise and faster.

The steps and related functions described above in FIGS. 3 to 7 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step.

The techniques described herein may be implemented by various means so that an apparatus implementing one or more functions/operations described above with an embodiment/example, for example by means of any of FIGS. 1 to 8F and any combination thereof, comprises not only prior art means, but also means for implementing the one or more functions/operations of a corresponding functionality described with an embodiment, for example by means of any of FIGS. 1 to 8F and any combination thereof, and it may comprise separate means for each separate function/operation, or means may be configured to perform two or more functions/operations. For example, one or more of the means and/or a tree generation unit for one or more functions/operations described above may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions de-scribed herein.

Figure 9:
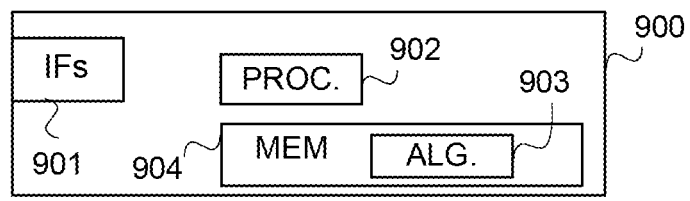
FIG. 9 is a schematic block diagram of an exemplary apparatus.

FIG. 9 is a simplified block diagram illustrating some units for an apparatus 900 comprising of the tree generation unit, or configured otherwise to perform at least some functionality described above, for example by means of any of FIGS. 3 to 8F and any combination thereof, or some of the functionalities if functionalities are distributed in the future. In the illustrated example, the apparatus comprises one or more interface (IF) entities 901, one or more processing entities 902 connected to various interface entities 901 and to one or more memories 904.

The one or more interface entities 901 are entities for receiving and transmitting information, such as user input and what to display on one or more display devices.

A processing entity 902 is capable to perform calculations and configured to implement at least the tree generation unit described herein, or at least part of functionalities/operations described above, for example by means of any of FIGS. 3 to 8F and any combination thereof, as a corresponding unit or a sub-unit if distributed scenario is implemented, with corresponding algorithms 903 stored in the memory 904 The entity 902 may include a processor, controller, control unit, micro-controller, unit, module, etc. suitable for carrying out embodiments or operations described above, for example by means of any of FIGS. 3 to 8F and any combination thereof. Generally the processor is a central processing unit, but the processor may be an additional operation processor.

A memory 904 is usable for storing a computer program code required for the tree generation unit, or a corresponding unit or sub-unit, or for one or more functionalities/operations described above, for example by means of any of FIGS. 3 to 8F and any combination thereof, i.e. the algorithms for implementing the functionality/operations described above by means of any of FIGS. 3 to 8F and any combination thereof. The memory 904 may also be usable for storing other possible information, like the history log information, the tree information and/or any temporarily stored information.

As a summary, each or some or one of the units/sub-units and/or algorithms for functions/operations described herein, for example by means of means of any of FIGS. 3 to 8F and any combination thereof, may be configured as a computer or a processor, or a microprocessor, such as a single-chip computer element, or as a chipset, or one or more logic gates including at least a memory for providing storage area used for arithmetic operation and an operation processor for executing the arithmetic operation. Each or some or one of the units/sub-units and/or algorithms for functions/operations described above, for example by means of means of any of FIGS. 3 to 8F and any combination thereof, may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed and/or will be programmed by downloading computer program code (one or more algorithms) in such a way to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus, constitute the tree generation unit or an entity providing corresponding functionality, or at least part of the corresponding functionality. Programs, also called pro-gram products, including software routines, program snippets constituting "program libraries", applets and macros, can be stored in any medium and may be downloaded into an apparatus. In other words, each or some or one of the units/sub-units and/or the algorithms for one or more functions/operations described above, for example by means of means of any of FIGS. 3 to 8F and any combination thereof, may be an element that comprises one or more arithmetic logic units, a number of special registers and control circuits.

It will be obvious to a person skilled in the art that, as the technology advances, the inventive concept can be implemented in various ways. The invention and its embodiments are not limited to the examples described above but may vary within the scope of the claims.

What is claimed is:

1. A method for outputting history log information of a running application in a continuous tree-view structure on a user interface, the method comprising:

maintaining, by a computing device, in a runtime memory, at least history log information on completed actions of the running application and reversed actions created by one or more completed undo functions, each completed action and each reversed action creating a state, a completed undo function undoing one or more previous completed actions to one or more reversed actions and causing an undo loop between a first state created by an action to which the undo function is performed and a second state created by the last reversed action of the completed undo function;

traversing, by the computing device, through states created by completed actions and reversed actions in the history log information;

searching, by the computing device, for each state, which is either the first state or the second state of an undo loop, another end of the undo loop in the traverse direction of the history log information, and if another end is found, determining a pair of ends of the undo loop;

using, by the computing device, the pairs of ends to determine intersecting undo loops;

using, by the computing device, a predetermined rule set to determine which one of two or more intersecting undo loops is selected to be outputted as an undo loop in the tree-view structure; and outputting, by the computing device, completed actions or states created by the completed actions at most once in the continuous tree-view structure showing undo loops either collapsed so that the continuous tree-view structure remains linear on the same level of the tree-view structure, or in a sub-level of a level of the tree-view structure so that the continuous tree-view structure makes a curve to the sub-level and returns from the sub-level to the level when the other end of the outputted undo loop is reached, wherein the showed undo loops comprise undo loops that are not intersecting with one or more other undo loops, and from each set of intersecting undo loops the one that is selected to be outputted as the undo loop and completed actions or states created by the completed actions in the one or more other non-selected intersecting undo loops that are not also in the selected intersected undo loop are outputted in the continuous tree-view structure in the level as completed actions or states create by the completed actions.

2. The method of claim 1, further comprising:
using, by the computing device, the pairs of ends to determine nested undo loops, a nested undo loop having its pair of ends within a pair of ends of an overlapping loop;
when the overlapping loop is outputted on a sub-level in the tree-view structure, outputting, by the computing device, a nested undo loop as collapsed or in a further sub-level of the tree-view structure.

3. The method of claim 1, further comprising:
outputting, by the computing device, an undo loop as collapsed by outputting a sign indicating a collapsed undo loop between the second state and a state following the first state.

4. The method of claim 3, further comprising, in response to detecting, by the computing device, a user input opening a collapsed loop:
replacing, by the computing device, the sign with one or more signs indicating possibility to collapse the undo loop;
determining, by the computing device, the pair of ends of the collapsed undo loop;
determining, by the computing device, intersecting undo loops within the pair of the ends and selecting, by the computing device, which one of the intersecting undo loops is outputted as undo loops;
determining, by the computing device, nested undo loops within the pair of the ends;
outputting, by the computing device, each selected undo loop and each nested undo loops within the pair of the ends as collapsed loops, each collapsed loop with a sign indicating a collapsed undo loop; and
outputting, by the computing device, remaining completed actions, or the states created by the completed actions within the pair of ends, including the completed action that created the first state or the first state, in a corresponding sub-level in the tree-view structure.

5. The method of claim 1, further comprising traversing, by the computing device, the history log information from the newest state to the oldest state or to a Nth state from the newest state.

6. The method of claim 1, further comprising traversing, by the computing device, the history log information from the oldest state to the newest state.

7. The method of claim 1, further comprising:
receiving, by the computing device, as a user input, a starting point wherefrom to create the tree-view structure; and
performing, by the computing device, at least one of traversing the history log information from the starting point to the newest state and traversing the history log information from the starting point towards the oldest state.

8. The method of claim 1, further comprising:
using, by the computing device, a preconfigured starting point, other than the newest or oldest state, wherefrom to create the tree-view structure; and
performing, by the computing device, at least one of traversing the history log information from the preconfigured starting point to the newest state and traversing the history log information from the preconfigured starting point towards the oldest state.

9. The method of claim 1, wherein the predetermined rule set comprises at least one of a rule based on which the longest one of the intersecting two or more undo loops in the traverse direction is selected to be outputted as an undo loop, a rule based on which the undo loop having one of the ends in the pair of ends nearest to a starting position of the history log information is selected to be outputted as an undo loop, a rule based on which the undo loop having the lowest or the biggest sum of weights, calculated using weights associated with the actions to be undone, is selected to be outputted as an undo loop, and a rule based on a heuristic function.

10. A non-transitory computer readable medium comprising program instructions for causing a computing device at least to perform steps comprising:
maintaining, in a runtime memory, at least history log information on completed actions of a running application and reversed actions created by one or more completed undo functions, each completed action and each reversed action creating a state, a completed undo function undoing one or more previous completed actions to one or more reversed actions and causing an undo loop between a first state created by an action to which the undo function is performed and a second state created by the last reversed action of the completed undo function;
traversing through states created by completed actions and reversed actions in the history log information;
searching for each state, which is either the first state or the second state of an undo loop, another end of the undo loop in the traverse direction of the history log information, and if another end is found, determining a pair of ends of the undo loop;

using the pairs of ends to determine intersecting undo loops;

using a predetermined rule set to determine which one of two or more intersecting undo loops is selected to be outputted as an undo loop in a tree-view structure on a user interface; and outputting on the user interface completed actions or states created by the completed actions at most once in a continuous tree-view structure showing undo loops either collapsed so that the continuous tree-view structure remains linear on the same level of the tree-view structure, or in a sub-level of a level of the tree-view structure so that the continuous tree-view structure makes a curve to the sub-level and returns from the sub-level to the level when the other end of the outputted undo loop is reached, wherein the showed undo loops comprise undo loops that are not intersecting with one or more other undo loops, and from each set of intersecting undo loops the one that is selected to be outputted as the undo loop and completed actions or states created by the completed actions in the one or more other non-selected intersecting undo loops that are not also in the selected intersected undo loop are outputted in the continuous tree-view structure in the level as completed actions or states create by the completed actions.

11. The non-transitory computer readable medium of claim 10, further comprising program instructions for causing the computing device at least to perform:

using the pairs of ends to determine nested undo loops, a nested undo loop having its pair of ends within a pair of ends of an overlapping loop;

when the overlapping loop is outputted on the user interface on a sub-level in the tree-view structure, outputting a nested undo loop as collapsed or in a further sub-level of the tree-view structure.

12. The non-transitory computer readable medium of claim 10, further comprising program instructions for causing the computing device at least to perform:

outputting on the user interface an undo loop as collapsed by outputting a sign indicating a collapsed undo loop between the second state and a state following the first state; and in response to detecting a user input opening a collapsed loop:

replacing the sign with one or more signs indicating possibility to collapse the undo loop;

determining the pair of ends of the collapsed undo loop;

determining intersecting undo loops within the pair of the ends and selecting which one of the intersecting undo loops is outputted as undo loops;

determining nested undo loops within the pair of the ends;

outputting on the user interface each selected undo loop and each nested undo loops within the pair of the ends as collapsed loops, each collapsed loop with a sign indicating a collapsed undo loop; and outputting on the user interface remaining completed actions, or the states created by the completed actions within the pair of ends, including the completed action that created the first state or the first state, in a corresponding sub-level in the tree-view structure.

13. The non-transitory computer readable medium of claim 10, further comprising program instructions for causing the computing device to perform at least one of:

traversing the history log information from the newest state to the oldest state or to a Nth state from the newest state;

traversing the history log information from the oldest state to the newest state;

traversing, in response to receiving, as a user input, a starting point wherefrom to create the tree-view structure, the history log information from the starting point to the newest state;

traversing, in response to receiving, as the user input, the starting point wherefrom to create the tree-view structure, the history log information from the starting point towards the oldest state;

traversing the history log information from a preconfigured starting point, other than the newest or oldest state, wherefrom to create the tree-view structure, to the newest state; and traversing the history log information from the preconfigured starting point, other than the newest or oldest state, wherefrom to create the tree-view structure, towards the oldest state.

14. The non-transitory computer readable medium of claim 10, further comprising program instructions for causing the computing device to perform at least one of:

selecting the longest one of the intersecting two or more undo loops in the traverse direction to be outputted as an undo loop;

selecting the undo loop having one of the ends in the pair of ends nearest to a starting position of the history log information to be outputted as an undo loop;

selecting the undo loop having the lowest sum of weights, calculated using weights associated with the actions to be undone, to be outputted as an undo loop;

selecting the undo loop having the biggest sum of weights, calculated using the weights associated with the actions to be undone, to be outputted as an undo loop; and using a heuristic function to select an undo loop to be outputted as an undo loop.

15. An apparatus comprising:

at least one user interface;

at least one processor; and at least one memory including computer program code, wherein the at least one memory and the computer program code are configured to, with the at least one processor, cause the apparatus at least to perform:

maintaining, in a runtime memory, at least history log information on completed actions of a running application and reversed actions created by one or more completed undo functions, each completed action and each reversed action creating a state, a completed undo function undoing one or more previous completed actions to one or more reversed actions and causing an undo loop between a first state created by an action to which the undo function is performed and a second state created by the last reversed action of the completed undo function;

traversing through states created by completed actions and reversed actions in the history log information;

searching for each state, which is either the first state or the second state of an undo loop, another end of the undo loop in the traverse direction of the history log information, and if another end is found, determining a pair of ends of the undo loop;

using the pairs of ends to determine intersecting undo loops;

using a predetermined rule set to determine which one of two or more intersecting undo loops is selected to be outputted as an undo loop in a tree-view structure on a user interface; and outputting on the user interface completed actions or states created by the completed actions at most once in a continuous tree-view structure showing undo loops either collapsed so that the continuous tree-view structure remains linear on the same level of the tree-view structure, or in a sub-level of a level of the tree-view structure so that the continuous tree-view structure makes a curve to the sub-level and returns from the sub-level to the level when the other end of the outputted undo loop is reached, wherein the showed undo loops comprise undo loops that are not intersecting with one or more other undo loops, and from each set of intersecting undo loops the one that is selected to be outputted as the undo loop and completed actions or states created by the completed actions in the one or more other non-selected intersecting undo loops that are not also in the selected intersected undo loop are outputted in the continuous tree-view structure in the level as completed actions or states create by the completed actions.

16. The apparatus of claim 15, wherein the at least one memory and computer program code configured to, with the at least one processor, further cause the apparatus at least to perform:

using the pairs of ends to determine nested undo loops, a nested undo loop having its pair of ends within a pair of ends of an overlapping loop;

when the overlapping loop is outputted on the user interface on a sub-level in the tree-view structure, outputting a nested undo loop as collapsed or in a further sub-level of the tree-view structure.

17. The apparatus of claim 15, wherein the at least one memory and computer program code configured to, with the at least one processor, further cause the apparatus at least to perform:

outputting on the user interface an undo loop as collapsed by outputting a sign indicating a collapsed undo loop between the second state and a state following the first state.

18. The apparatus of claim 17, wherein the at least one memory and computer program code configured to, with the at least one processor, further cause, in response to detecting a user input opening a collapsed loop, the apparatus at least to perform:

replacing the sign with one or more signs indicating possibility to collapse the undo loop;

determining the pair of ends of the collapsed undo loop;

determining intersecting undo loops within the pair of the ends and selecting which one of the intersecting undo loops is outputted as undo loops;

determining nested undo loops within the pair of the ends;

outputting on the user interface each selected undo loop and each nested undo loops within the pair of the ends as collapsed loops, each collapsed loop with a sign indicating a collapsed undo loop; and outputting on the user interface remaining completed actions, or the states created by the completed actions within the pair of ends, including the completed action that created the first state or the first state, in a corresponding sub-level in the tree-view structure.

19. The apparatus of claim 15, wherein the at least one memory and computer program code configured to, with the at least one processor, further cause the apparatus to perform at least one of:

traversing the history log information from the newest state to the oldest state or to a Nth state from the newest state;

traversing the history log information from the oldest state to the newest state;

traversing, in response to receiving, as a user input, a starting point wherefrom to create the tree-view structure, the history log information from the starting point to the newest state;

traversing, in response to receiving, as the user input, the starting point wherefrom to create the tree-view structure, the history log information from the starting point towards the oldest state;

traversing the history log information from a preconfigured starting point, other than the newest or oldest state, wherefrom to create the tree-view structure, to the newest state; and traversing the history log information from the preconfigured starting point, other than the newest or oldest state, wherefrom to create the tree-view structure, towards the oldest state.

20. The apparatus of claim 15, wherein the predetermined rule set comprises at least one of a rule based on which the longest one of the intersecting two or more undo loops in the traverse direction is to be selected to be outputted as an undo loop, a rule based on which the undo loop having one of the ends in the pair of ends nearest to a starting position of the history log information is to be selected to be outputted as an undo loop, a rule based on which the undo loop having the lowest or the biggest sum of weights, calculated using weights associated with the actions to be undone, is to be selected to be outputted as an undo loop, and a rule based on a heuristic function.

* * * * *